United States Patent [19]

Tanaka et al.

[11] Patent Number: 5,734,810
[45] Date of Patent: Mar. 31, 1998

[54] CLIENT SERVER SYSTEM PERFORMING AUTOMATIC RECONNECTION AND CONTROL METHOD THEREOF

[75] Inventors: Toshio Tanaka, Ebina; Shigeo Tsujioka, Fujisawa, both of Japan

[73] Assignee: Hitachi, Ltd., Tokyo, Japan

[21] Appl. No.: 498,484

[22] Filed: Jul. 5, 1995

[30] Foreign Application Priority Data

Jul. 6, 1994 [JP] Japan ................... 6-154020

[51] Int. Cl.$^6$ ................... H04L 12/00
[52] U.S. Cl. ................... 395/182.02
[58] Field of Search ................... 395/182.02, 650, 395/200.19, 680, 182.13; 370/216

[56] References Cited

U.S. PATENT DOCUMENTS

| | | | |
|---|---|---|---|
| 5,129,080 | 7/1992 | Smith | 395/575 |
| 5,408,649 | 4/1995 | Beshears et al. | 395/575 |
| 5,442,749 | 8/1995 | Northcutt et al. | 395/200.09 |
| 5,580,177 | 12/1996 | Gase et al. | 400/61 |

OTHER PUBLICATIONS

Smith, "Simplify Client-Server Applications Using the DDE Management Library", Microsoft Systems Journal, Dec. 1992, V7, N8, p. 61.

*Primary Examiner*—Robert W. Beausoliel, Jr.
*Assistant Examiner*—Stephen C. Elmore
*Attorney, Agent, or Firm*—Antonelli, Terry, Stout, & Kraus, LLP

[57] ABSTRACT

In a client server system including a server machine including a network device and a plurality of client machines each including a network machine, the server machine includes a unit to send shutdown information indicating the shutdown state thereof and restoration information to the client machines and each client machine includes a control logic operative at reception of shutdown information from the server machine to conduct an attempt for line connection to the server machine at a desired interval of time. As a result, at restoration of the server machine from the shutdown state, the state of connection to each client machine is automatically achieved from the client side. Accordingly, at shutdown of the server machine, the logical line connection can be reconstructed without any intervention of the user of each client machine.

16 Claims, 8 Drawing Sheets

CLIENT SERVER SYSTEM PERFORMING AUTOMATIC RECONNECTION AND CONTROL METHOD THEREOF

BACKGROUND OF THE INVENTION

The present invention relates to a client server system and control technology thereof and, in particular, to a technology effective to more smoothly restore connections between communication lines at points of failure in a network system using personal computers and the like.

Personal computers have been broadly utilized in various fields these days. This leads to the recent advent of a client server system (to be referred to as CSS herebelow) including personal computers. In such a client server system, it is possible to execute main jobs which were heretofore achieved by a large-sized computer and its terminal equipment. In the system, a middle-sized or large-sized personal computer (server machine) including a high-performance central processing unit (CPU) and a large-capacity file storage facility is connected to small-sized personal computers (client machines) via network interface devices of the respective machines so that client machines are allowed to access information accumulated in the server machine. That is, each client can write information in or read information from the server machine. Moreover, information items can be communicated between client machines via the server machine.

In the client server system, although the server and client machines are in terms of hardware, linked with each other by communication cables via the network interfaces, logical connections of network channels are established therebetween as follows. In a state in which the server and client machines are powered, a line connection program is first executed in the server machine and then in all of the client machines. Alternatively, when the program is in an operative state in the server machine, the client machines can establish connections at a desired point of time. Conversely, when the server machine is not powered or when the line connecting program is in an inoperative state in the powered server machine, even if a client machine executes the line connection program, the logical connection cannot be established therebetween. In addition, although a plurality of server machines are generally coupled with one server machine, the logical connection of the network communication lines between a client machine and the server machine can be initiated only by the client machine. Consequently, it is impossible for the line connection program of the server machine to establish a logical connection to or all client machines or even a particular client machine.

When the logical line connections are interrupted due to a shutdown or system down occasionally taking place in the server machine for whatever reason or due to temporary termination of the line connection program in the server machine, the server machine is unable to restore the connections. Namely, even when the server machine restarts operation thereof and executes the line connection program, the line connections cannot be reconstructed again. Ordinarily, the user of a client machine acquires the status of logical connection only by issuing an access request to the server machine. Consequently, when the access request is rejected by the server machine, the user is required to interrupt a program being in operation. After confirming restoration of the server machine, the user executes the line connection program again to thereafter conduct a desired operation. According to Japanese Patent Application JP-A- 5-204877, there has been described a technology in which a machine notifies other machines of its shutdown state prior to initiation of an operation shutdown sequence. However, no description has been given of any improvement in restoration of line connections.

As described above, in the client server systems of the prior art, consideration has not been given to the re-connection of lines associated with, for example, shutdown of the server machine in an abnormal or emergency situation. This leads to a problem of unsatisfactory usability and reliability of the client server system.

SUMMARY OF THE INVENTION

It is therefore an object of the present invention to provide a client server system and control technology thereof in which at shutdown of the server machine of the system due to abnormal conditions, logical connections of communication lines can be restored without any intervention by the users of client machines.

The client server system according to the present invention includes a server machine including information transmitting means for transmitting information items related to shutdown of the server and restoration therefrom according to a state of the server machine and client machines, where in each client machines includes means for conducting an operation to connect a communication line to the server machine according to the shutdown and restoration information items from the information transmitting means of the server.

In the server machine, immediately before shutdown occurs due to an abnormal condition such as a failure occuring or immediately before a temporary termination of a line connection program, the shutdown information is transmitted to the client machines. Upon receiving the shutdown information, each client machine turns on a shutdown flag disposed therein and sets the internal state thereof to a shutdown mode. In the shutdown mode, when an access request therefrom to the server is rejected, the client machine attempts the request again when a predetermined period of time lapses thereafter. When the server machine becomes in a normal state and accepts the access request, the client machine turns off the shutdown flag and returns to a normal operation mode. During the processing above, the users of client machines need not be attentive to execution thereof.

In the client server system and control method thereof according to the present invention, even when shutdown occurs in the server machine at an abnormal state thereof, the logical connections of communication lines can be reconstructed while the users of client machines do not recognize occurrence of shutdown. This consequently improves usability and reliability of the client server system.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

First Embodiment

Referring now to FIGS. 1 to 6, description will be given of a first embodiment according to the present invention.

Figure 1:
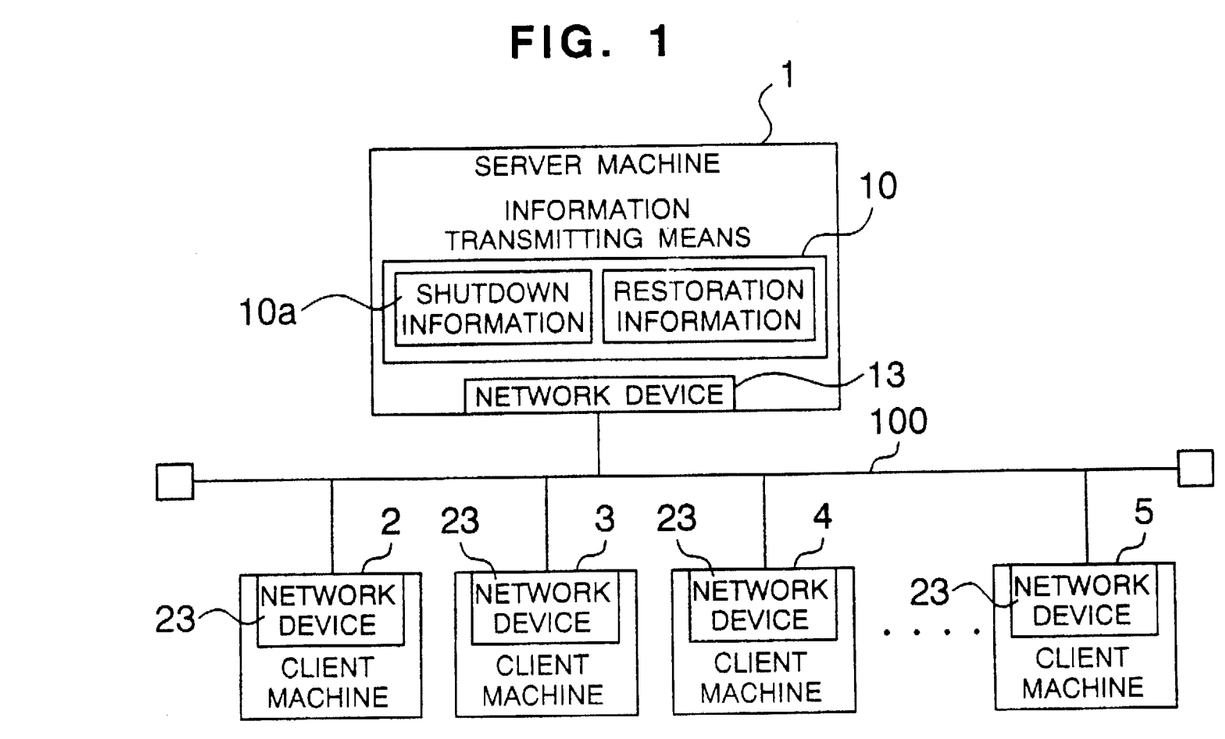
FIG. 1 is a block diagram showing an example of the configuration of an embodiment of the client server system according to the present invention.

In FIG. 1, reference numeral 1 indicates a server machine such as an intermediate-sized or large-sized personal computer including a high-performance CPU and a large-capacity file storing device, numeral 13 denotes a network interface facility disposed in the server machine 1, and numerals 2 to 5 represent client machines each including a small-sized personal computer or the like and the client machines are linked with the server machine 1 via a network communication cable 100. The client machine further includes a network interface device 23 capable of conducting the same communication establishing operation as the network device 13 of the server machine 1. In an ordinary case, a plurality of client machines 2 to 5 are coupled with one server machine 1. In the embodiment, since the plural client machines 2 to 5 are substantially equal to each other in constitution and operation, the client machine 2 is used as the representative thereof in the following description unless otherwise specified. As the server and client machines, there are respectively adopted Hitachi's FLORA3100MT/LT and FLORA3010CU/CT, for example.

The server 1 of the embodiment includes information transmitting means 10 for transmitting shutdown information 10a and restoration information 10b to the client machine 2.

Figure 2A:
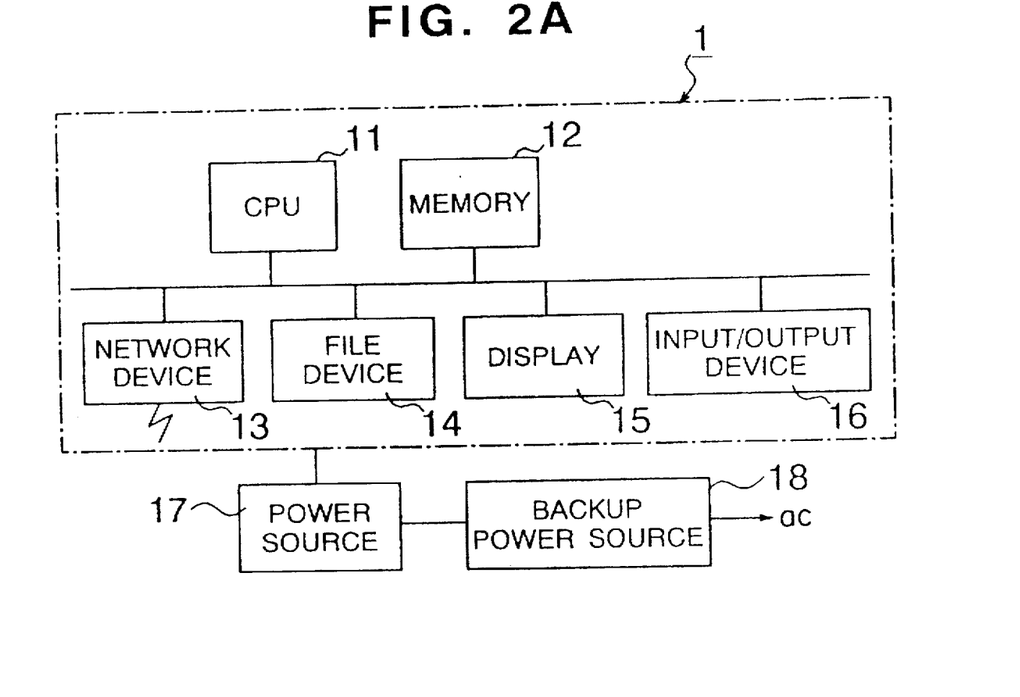
FIGS. 2A and 2B are block diagrams showing hardware configuration examples respectively of a server machine and a client machine of the embodiment.
Figure 2B:
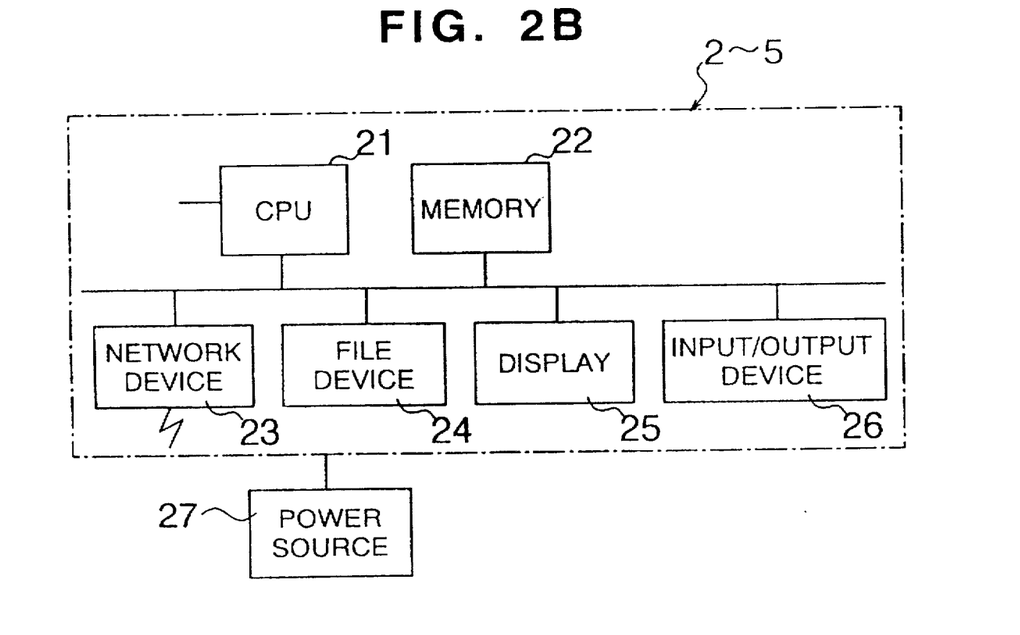

FIGS. 2A and 2B are block diagrams showing hardware construction examples respectively of the server machine 1 and client machine 2. In the configuration of server machine of FIG. 2A, a reference numeral 11 denotes a high-performance CPU, numeral 12 indicates a main memory to provisionally store therein various programs, numeral 13 represents a network device, numeral 14 designates a file storage device to store therein programs and data, numeral 15 represents a display, and numeral 16 indicates an input/output device including, for example, a keyboard and/or a mouse. These constituent elements are powered by a power source 17. In addition, when the power supply 17 is connected via a backup power source 18 to an external alternating-current (ac) power source, it is possible to power the server machine 1 for a predetermined period of time in which the server machine 1 is possibly turned off under abnormal conditions such as, for example, failure of the external ac power. FIG. 2B shows a configuration example of the client machine 2, which is constructed basically in the same fashion as the server machine 1. The configuration of client machine 2 includes a CPU 21, a memory 22, a network device 23, a file device 24, a display 25, an input/output device 26, and a power source 27. In general, the CPU 21 has performance lower than that of the server machine 1 and the capacity of the file device 24 is less than that of the CPU 11. Furthermore, since the power source 27 may possibly include a battery, there is missing a backup power source.

Figure 3A:
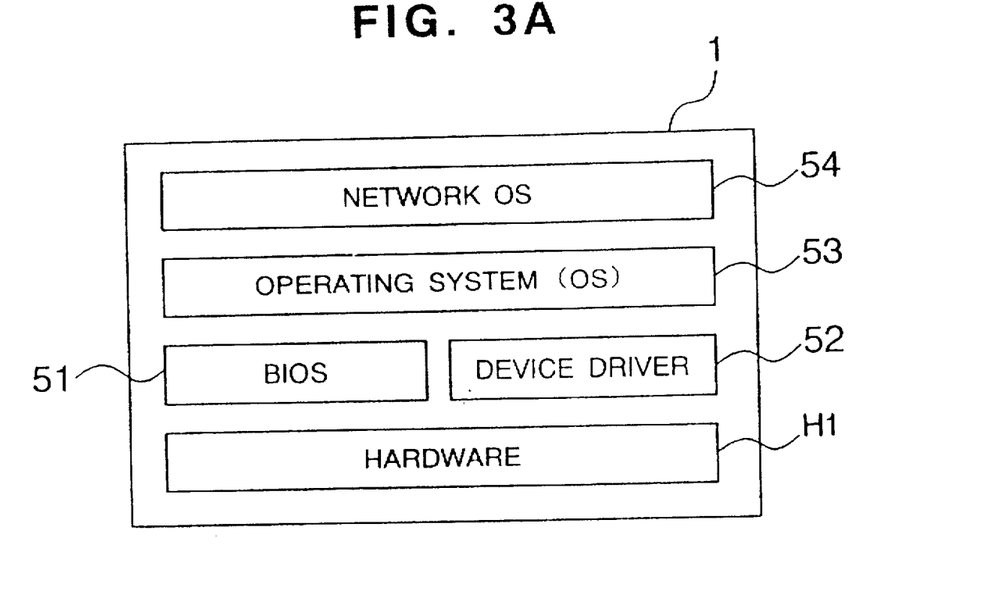
FIGS. 3A and 3B are diagrams hierarchically showing the software configurations respectively of a server machine and a client machine of the embodiment.
Figure 3B:
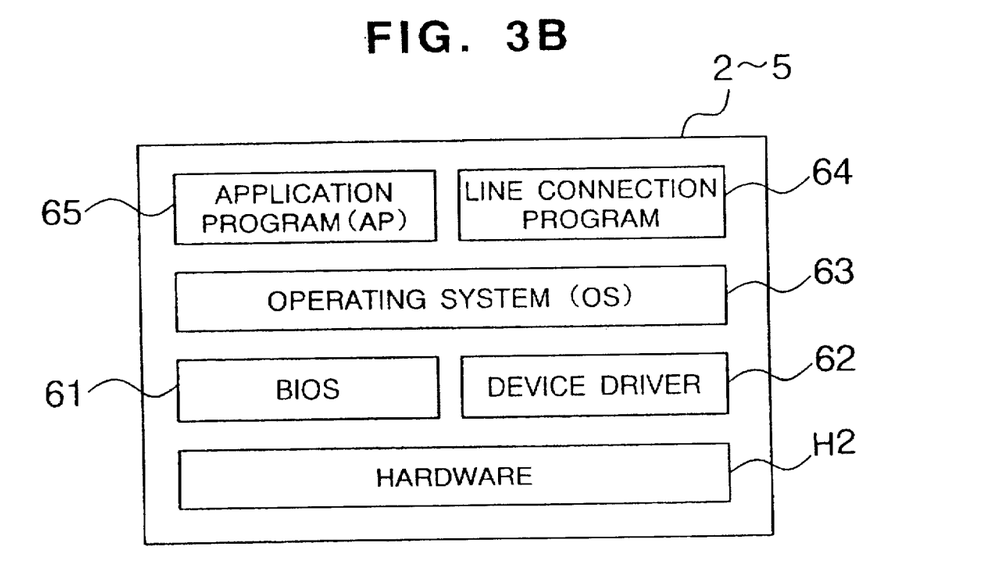

FIGS. 3A and 3B respectively show examples of hierarchic software configurations of the server machine 1 and client machine 2, respectively. In FIG. 3A, the software structure of the server machine 1 includes a basic input/output program (BIOS) 51 to directly operate the hardware of the server machine H1, a device driver 52, and an operating system (OS) 53 which defines input/output operations between an application program (AP) and the hardware H1 via the BIOS 51 and device driver 52. In the server machine 1, a network operating system (OS) 54 operates in place of an ordinary application program under control of the operating system 53 such that connections of network communication lines are established under supervision of the network operating system 54. FIG. 3B shows the software constitution of the client machine 2, which is fundamentally identical to that of the server machine 1. The software system also includes a basic input/output program (BIOS) 61 which directly operates the hardware H2, a device driver 62, and an operating system (OS) 63. In this case, a general application program (AP) 65 and a line connection program 64 operate under control of the operating system 63.

Figure 4:
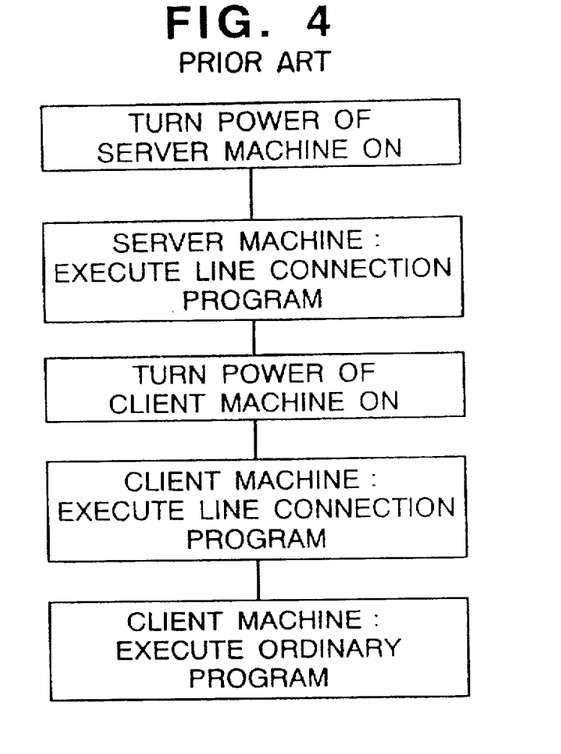
FIG. 4 is a flowchart showing a prior art example of the procedure of initiating operation of the client server system in an ordinary state.

Referring now to the flowchart of FIG. 4, description will be given of the procedure to start operation of the CSS having the configuration described above in an ordinary state. First, the server machine 1 is powered to execute the line connection program (network OS 54). Subsequently, the client machine 2 is powered to initiate the line connection program 64. Resultantly, the server machine 1 is logically linked with the client machine 2 to communicate information therebetween. In the client machine 2, the ordinary application program 65 is executed such that the server machine 1 is accessed when necessary so as to conduct read and write operations information. When the network operating system 54 is in operation in the server machine 1, the client machine 2 can establish line connection thereto at an arbitrary point of time. Conversely, when the server machine 1 is not powered or where the network operating system 54 is not in the running state in the powered server machine 1, the logical connection cannot be formed therebetween even when the client machine 2 executes the line connecting program 64. In addition, the request for the logical connection of network communication lines can be issued only from the client machine 2 to the server machine 1. Consequently, it is impossible for the network operating system 54 of the server machine 1 to establish logical connections to particular or all client machines 2.

Figure 5:
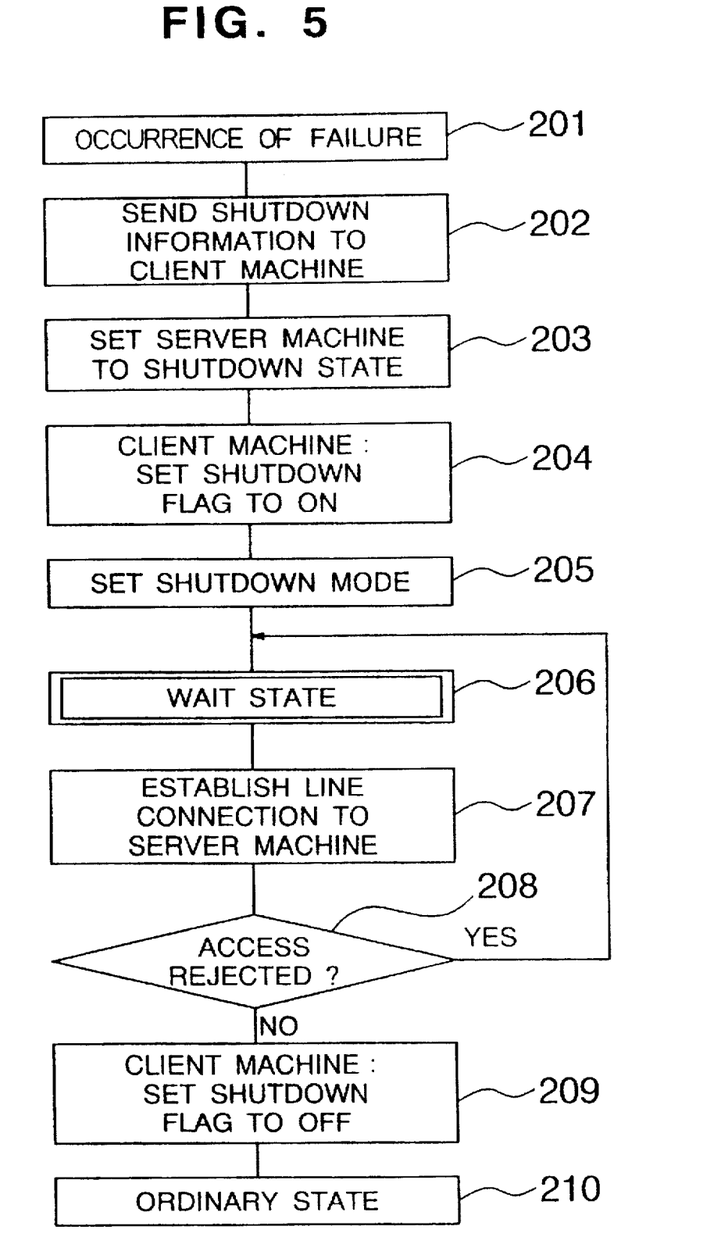
FIG. 5 is a flowchart showing an example of operation of the client server system and control method thereof in the embodiment.
Figure 6:
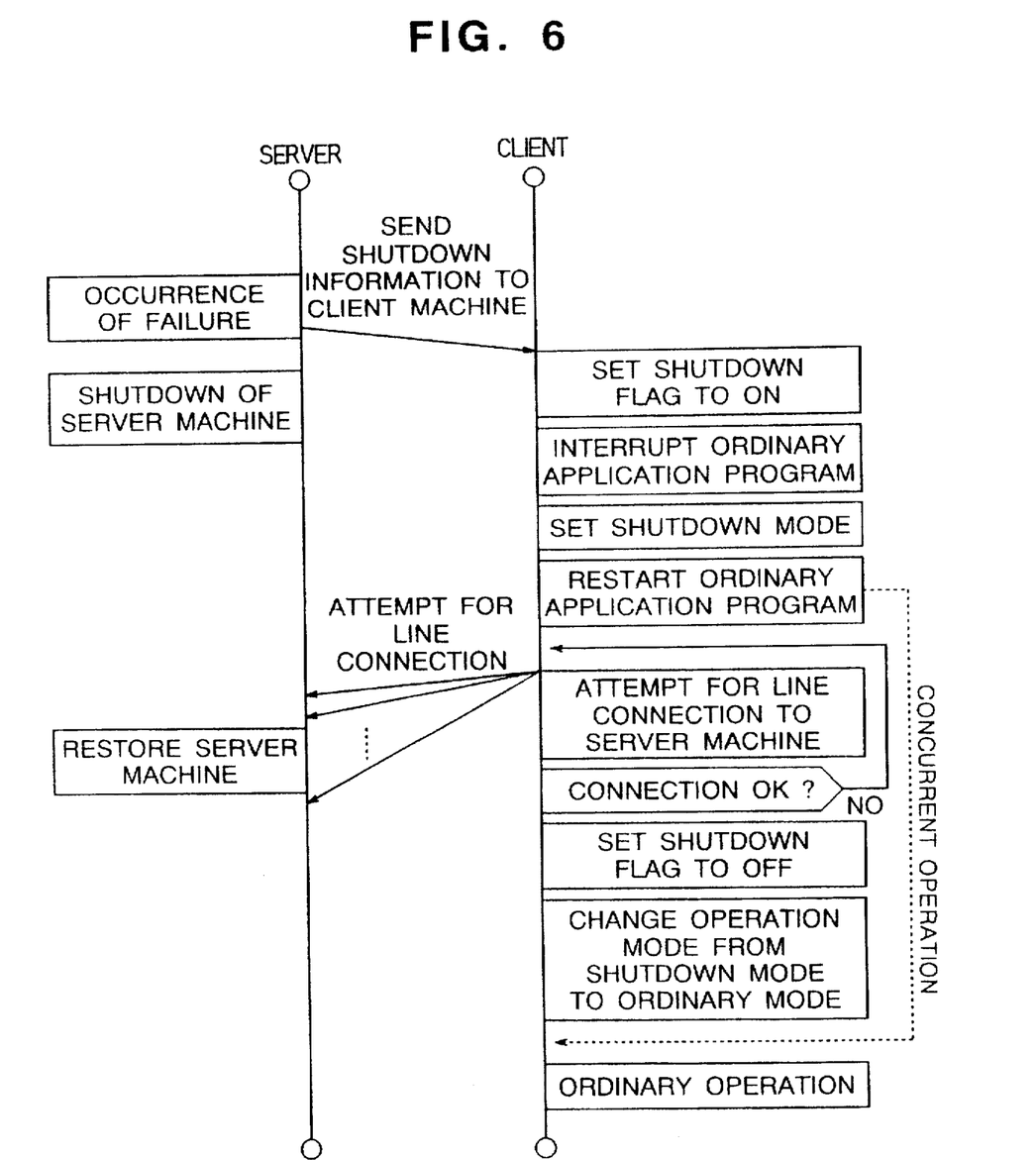
FIG. 6 is a diagram showing an example of operations respectively of a server machine and a client machine.

FIG. 5 shows a processing flow for shutdown of the server machine due to a failure occurring in the CSS of this embodiment. The flowchart covers an operation ranging from interruption of the network line connection between the server 1 and the client 2 to restoration thereof. When the server machine 1 is set to a shutdown state or when the network operating system 54 is stopped due to an abnormal state caused by, for example, occurrence of failure (step 201), the server machine 1 sends shutdown information 10a to the client machine 2 immediately before the server machine 1 is set to a shutdown state or the network operating system 54 is stopped (step 202). After the shutdown processing is completed, the server machine 1 is set to the shutdown state (step 203).

The shutdown information 10a is transmitted from the network device 13 of the server machine 1 via the network cable 100 to the network device 23 of the client machine 2 and is then reported to the operating system 63 via a network driver included in the device driver 62 of the client machine 2. According to the shutdown information 10a, the operating system 63 of the client machine 2 sets the internal shutdown flag to on (step 204) and then sets the internal state to the shutdown mode (step 205).

In the shutdown mode, the operating system 63 of the client machine 2 invokes the line connection program 64 such that the program 64 is executed in concurrence with the application program 65 already in the running state. Thereafter, when a predetermined period of time elapses (step 206), the program 64 makes an attempt again to establish line connection to the server machine 1 (step 207).

On this occasion, if the server machine 1 has already been restored to the normal state and the network operating system 54 is in the operative state, the request for the logical line connection will be accepted. However, when the server machine 1 is still in the failed state, the access request from the line connection program 64 is rejected. In this situation, control is returned to step 206 to try the server access again after the predetermined period of time (step 208). Although not shown, when the server machine 1 is restored and the network operating system 54 becomes operative, the access request from the program 64 is accepted and hence the logical connection is established between the server machine 1 and the client machine 2. After the request is accepted, the operating system 63 of the client machine 2 sets the shutdown flag to off (step 209) and then returns to the ordinary operation mode (step 210).

Since the processing sequence of operations above is accomplished between the network operating system 54 of the server machine 1 and the operating system 63 of the client machine 2, the user of the client machine 2 need not pay attention to shutdown and restoration of the server machine 1. Incidentally, there may be arranged a register to desirably set the waiting time period to the register in step 206.

In the client server system according to the present invention described above, at shutdown of the server machine 1 under abnormal conditions of the system, the logical connections of communication lines can be restored without any intervention by the user of the client machine 2. This consequently improves usability and reliability of the client server system.

In the embodiment, the server machine 1 notifies the shutdown state to the client machine 2 prior to shutdown thereof. However, the client server system may be configured, for example, as follows. The shutdown message is not sent to the client machines at shutdown of the server machine. Namely, shutdown information is kept in the pertinent server machine. When the server machine is restored to the normal state thereafter, the shutdown information, if retained therein, is transmitted to the client machines and then the information is cleared in the server machine. In the configuration, each client machine includes means responsive to reception of restoration information for executing the line connection program to establish line connection to the server machine.

Second Embodiment

Figure 7:
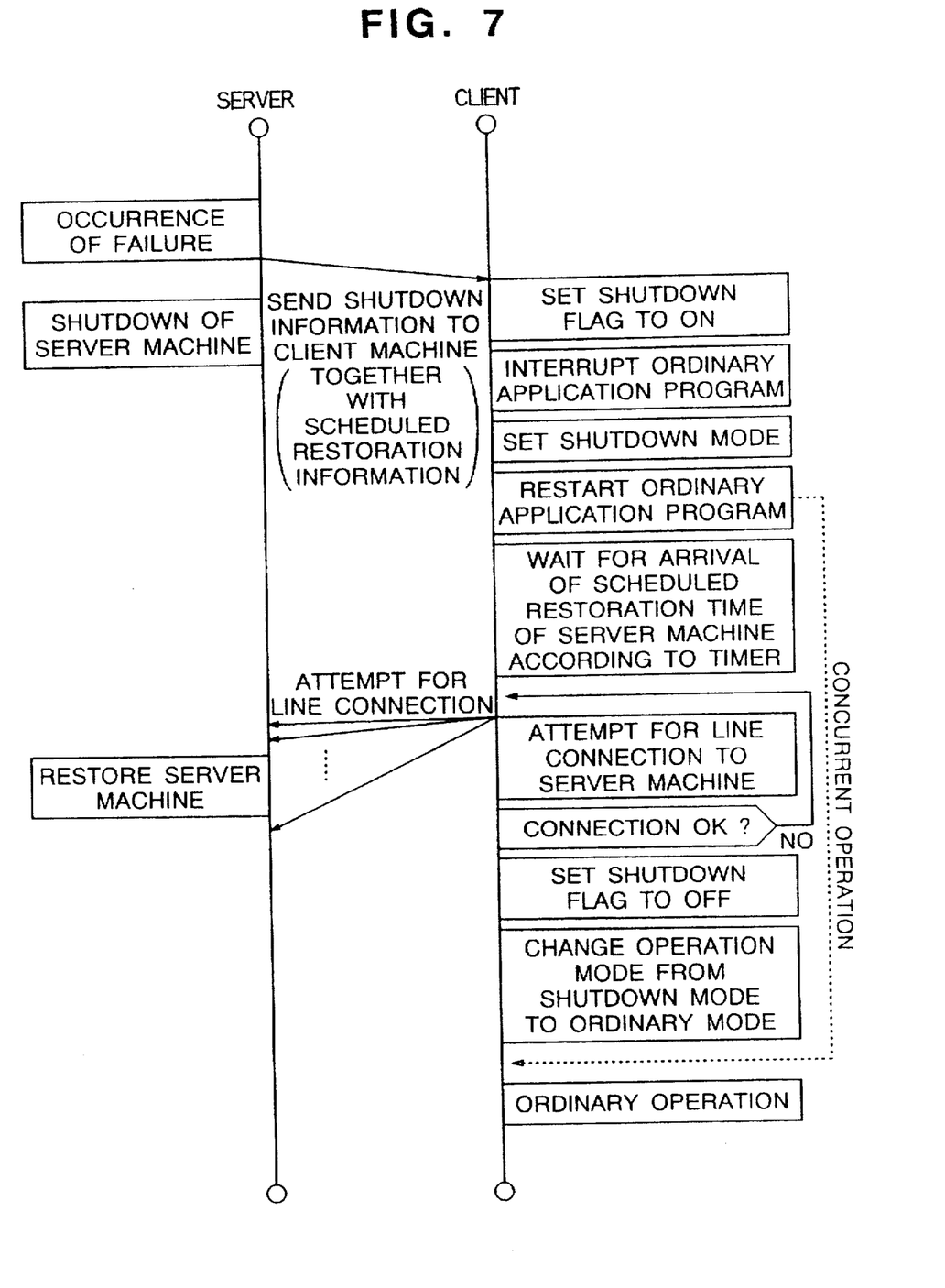
FIG. 7 is diagram for explaining an example of operations of the CSS control method in another embodiment of the present invention.

The second embodiment differs from the first embodiment in the operation at shutdown of the server machine 1. Namely, when the period of time required for the restoration of server machine 1 from the shutdown state is known (shutdown other than those caused by an abnormal state, for example, shutdown for scheduled maintenance of the server machine 1), shutdown information 10a and restoration information 10b are sent to the client machine 2. In response thereto, the client machine 2 suppresses the retry for line connection until the preset restoration point of time of the server machine 1 according to elapsed time measured, for example, by a timer.

As a result, there is attained an advantageous effect similar to that of the first embodiment; moreover, unnecessary line restoring operation steps can be dispensed with.

Third Embodiment

Figure 8:
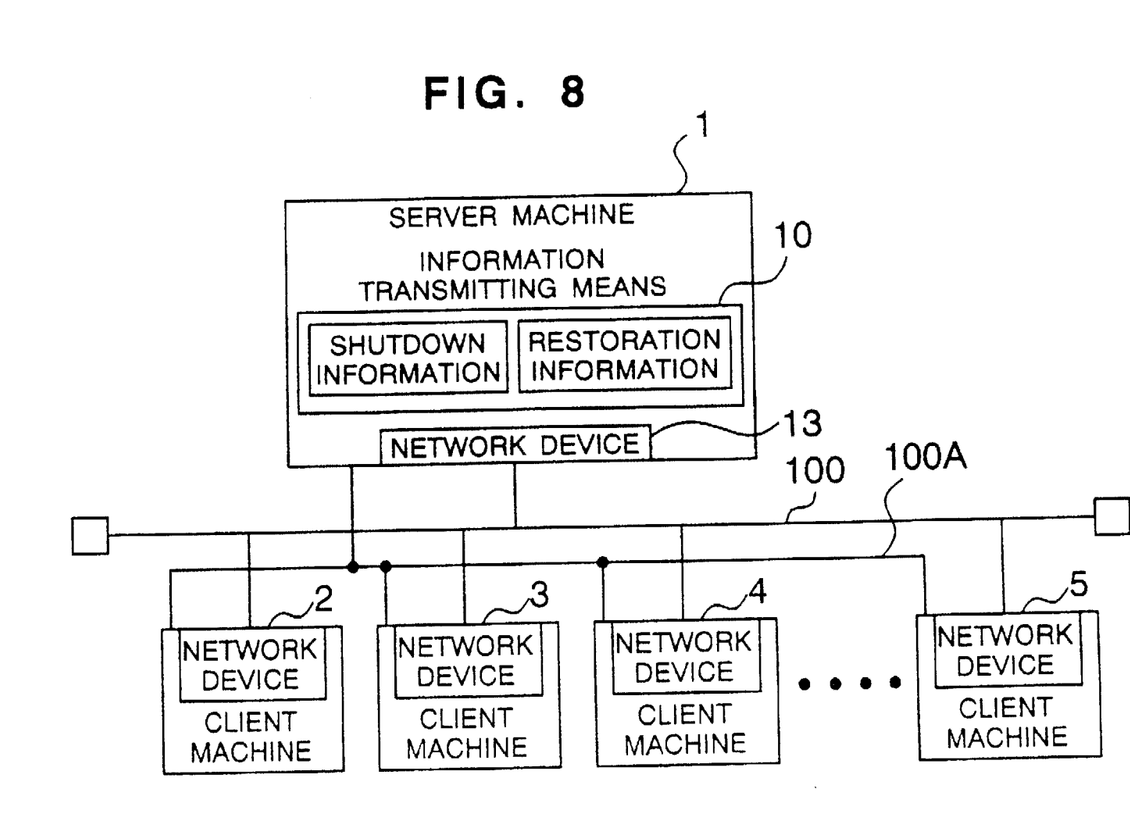
FIG. 8 is a block diagram showing structure of another embodiment of the client server system according to the present invention.

In the third embodiment, the shutdown state of the server machine 1 can be recognized by any client machine 2 via communication means 100A disposed in addition to the network cable 100. Processing after shutdown of the server machine 1 is the same as for the first and second embodiment. There can be attained similar advantageous effect also in this embodiment.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A client server system in which a server machine is connected via a network to client machines, wherein:

said server machine includes:

means for storing files therein;

first network connecting means for controlling communicating of signals with the network; and first processing means responsive to a request from the client machine for referring to said file storage means and achieving a file transferring operation, said first processing means is responsive to conditions which necessitate shutdown of said server machine by transferring shutdown forecast information to said client machines prior to shutdown processing; and each of said client machines includes:

second network connecting means for controlling communication of signals with the network;

input means for inputting data and commands to the respective one of said client machines;

second processing means responsive to an indication from said input means for establishing a logical line connection to said server machine and processing a file transferring request to said server machine, said second processing means operating when the second network connecting means receives said shutdown forecast information from said server machine for establishing a logical line connection to said server machine;

display means for displaying results of processing of said second processing means; and storage means for storing the data and the results of processing.

2. A client server system according to claim 1, wherein:

each of said client machines further include means for measuring time; and said second processing means repeatedly attempts to establish the logical line connection at a fixed interval of time by referring to the time measuring means, from the time when the shutdown forecast information is received to the time when the logical line connection to the client machine is completely established.

3. A client server system according to claim 2, wherein each of said client machines further include:

means for storing therein the fixed interval of time for repeating attempts for establishing the logical line connection by said second processing means; and means for updating the time interval in the time keeping means.

4. A client server system according to claim 1, wherein:

said first processing means of said server machine transmits scheduled restoration time of said server machine after shutdown to said network together with the shutdown forecast information; and said second processing means of said client machines initiate attempts to establish the logical line connection after a lapse of the scheduled restoration time.

5. A client server system according to claim 1, further including, in addition to the network, a communication line electrically connecting said server machine to each of said client machines, wherein said first processing means of said server machine sends the shutdown forecast information to said communication line.

6. An information processing system in which client machines are connected, via a network, to a server machine, comprising:

network connecting means for controlling communication of signals with said network;

input means for inputting data and commands to said information processing system;

processing means responsive to an indication from said input means for establishing a logical line connection from each of said client machines to said server machine and for processing a file transferring request to said server machine, said processing means being operative when said network connecting means receives shutdown forecast information from said server machine for attempting to establish a logical line connection to said server machine;

display means for displaying results of processing of said processing means; and storage means for storing therein the data and the results of processing.

7. An information processing system according to claim 6, wherein:

each of said client machines includes means for measuring time; and said processing means repeatedly attempts to establish the logical line connection at a fixed interval of time by referring to said time measuring means from the time when the shutdown forecast information is received to the time when the logical line connection to the client machine is completely established.

8. An information processing system according to claim 6, wherein:

said processing means includes storage means for storing therein a value of time; and the processing means initiates an attempt for establishing the logical line connection at a point of time indicated by the time value stored in said time value storage means.

9. A client server system in which a server machine including information processing means and communication control means is connected via a network to client machines which each include information processing means and communication control means, wherein:

said server machine includes:

means for detecting shutdown of said server machine; and means responsive to the shutdown detection by said detecting means for transmitting shutdown forecast information to said network; and the client machine includes:

means operative at reception of the shutdown forecast information for attempting to establish a logical line connection to said server machine.

10. A client server system according to claim 9, wherein:

each of said client machines further include means for measuring time; and said attempting means repeatedly attempts to establish the logical line connection at a fixed interval of time by referring to said time measuring means from the time when the shutdown forecast information is received to the time when the logical line connection to said client machine is completely established.

11. A client server system according to claim 10, wherein each of said client machines further includes:

means for storing therein a time period for repeating an attempt by said attempting means; and means for updating the attempt time stored in said time keeping means.

12. A client server system according to claim 9, wherein:

said transmitting means of said server machine transmits scheduled restoration time of said server machine after shutdown to said network together with the shutdown forecast information; and said attempting means of the client machine initiates the attempt after a lapse of the scheduled restoration time.

13. A client server system according to claim 9, further including, in addition to the network, a communication line electrically connecting said server machine to said client machines, wherein;

said transmitting means of said server machine transmits the shutdown forecast information to the communication line.

14. A client server system in which a server machine is connected via a network to client servers, wherein:

the server machine includes:

means for storing therein files;

first network connecting means for communicating signals with said network; and first processing means responsive to a request from any of said client servers for referring to said file storage means and achieving a file transferring operation, said first processing means is responsive to activation of said server for machine transferring restoration information indicating the activation of said server machine to said client servers; and each of said client servers includes:

second network connecting means for controlling communication of signals with said network;

input means for inputting data and commands to said respective client server;

second processing means responsive to an indication from said input means for establishing logical line connection to said server machine and processing a file transferring request to said server machine, said second processing means operating when said second network connecting means receives restoration information from said server machine for attempting to establish a logical line connection to said server machine;

display means for displaying thereon results of processing of said second processing means; and storage means for storing therein the data and the results of processing.

15. A client server system according to claim 14, wherein:

said server machine includes means for storing therein a flag indicating that said server machine is set to a shutdown state prior to shutdown processing when conditions require shutdown thereof; and said first processing means transmits the restoration information when the flag of the flag storing means indicates that said server machine is in the shutdown state.

16. A method of controlling a client server system including a network; a server machine connected to the network and including means for storing files therein, first network connecting means for communicating signals with the network and first processing means responsive to a request from the client machine for referring to the file storage means and achieving a file transferring operation; client machines each including second network connecting means for controlling communication of signals with the network, input means for inputting data and commands to the respective client machine, and second processing means responsive to an indication from the input means for establishing logical line connection to the server machine and processing a file transferring request to the server machine; display means for displaying results of processing of the second processing means; and storage means for storing therein the data and the results of processing, the client server system control method comprising the steps of:

notifying, prior to termination of operation of the server machine, shutdown thereof from the server machine to the client machine; and conducting, by the client machine, when the notification of shutdown is received, an attempt for establishing a logical line connection to the server machine at a desired interval of time in concurrence with execution of an ordinary application program.

* * * * *